(12) United States Patent
Gretz

(10) Patent No.: US 6,538,201 B1
(45) Date of Patent: *Mar. 25, 2003

(54) THREADED SNAP IN CONNECTOR

(75) Inventor: Thomas J. Gretz, Clarks Summit, PA (US)

(73) Assignee: Arlington Industries, Inc, Scranton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/034,156

(22) Filed: Dec. 26, 2001

(51) Int. Cl.[7] ................................. H02G 3/18
(52) U.S. Cl. ................ 174/65 G; 174/65 R; 174/135; 174/152 G; 16/2.1; 439/142; 285/921; 248/56
(58) Field of Search .................. 174/65 R, 65 G, 174/152 G, 153 G, 135, 151; 248/56; 16/2.1, 2.2; 439/142, 144, 411, 460; 285/921

(56) References Cited

U.S. PATENT DOCUMENTS

| | | | | |
|---|---|---|---|---|
| 5,453,579 A | * | 9/1995 | Cohea | 174/153 G |
| 5,545,854 A | * | 8/1996 | Ishida | 174/65 G X |
| 5,988,704 A | * | 11/1999 | Ryhman | 285/921 X |
| 6,114,631 A | * | 9/2000 | Gretz | 439/460 X |
| 6,211,464 B1 | * | 4/2001 | Mochizuki et al. | 174/65 G |
| 6,352,439 B1 | * | 3/2002 | Stark et al. | 174/65 R X |
| 6,353,185 B1 | * | 3/2002 | Sakata | 174/65 G |

* cited by examiner

*Primary Examiner*—Anthony Dinkins
*Assistant Examiner*—Dhiru R Patel

(57) ABSTRACT

The disclosure shows an electrical connector with both a snap ring and threaded end for fastening the connector to an access hole in an electrical junction box. The snap ring has snap lock tangs to hold the connector in the box and resist pull out forces. The snap ring also has grounding tangs for grounding the connector. Also, the connector has locking tabs that are designed to be seated in apertures located in the leading end of the connector. The connector has a threaded leading end having a standard pitch, which has been truncated to a smaller diameter. As the snap ring is very thin, it can be easily stamped from thin spring steel or its equivalent and mass-produced at a low unit cost. The snap locking tangs are deflected inward as they are pushed into a typical access hole in an outlet box or electrical panel. The thinness of the snap ring wall permits the snap ring to enter the hole of the electrical junction box and lock the ring and connector together to resist being pulled out. If the installer feels the connector should be threaded into a threaded access aperture or that a standard lock nut should be installed; it is only necessary to use a screwdriver or other tool to manually remove the snap ring and expose the truncated threads.

17 Claims, 4 Drawing Sheets

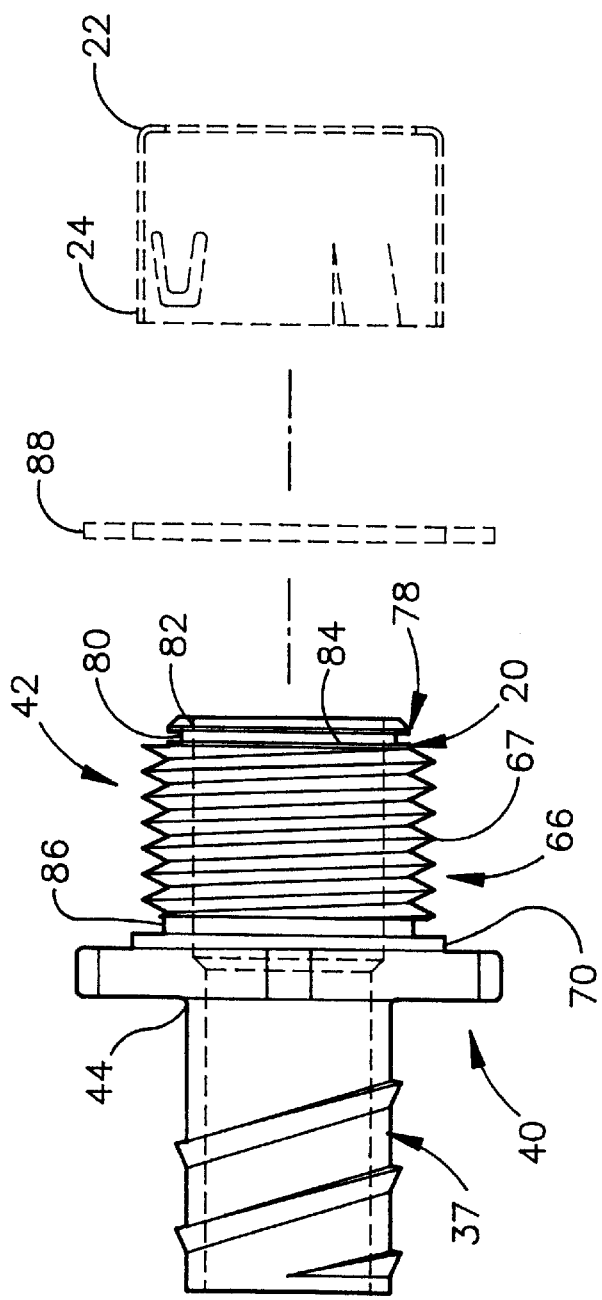
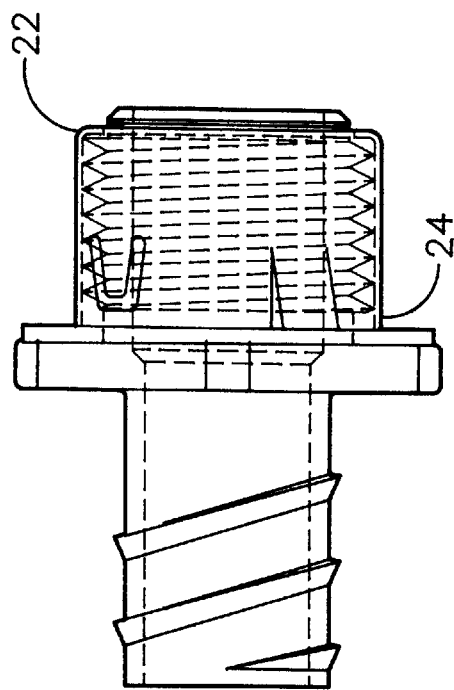
FIG. 2
FIG. 1

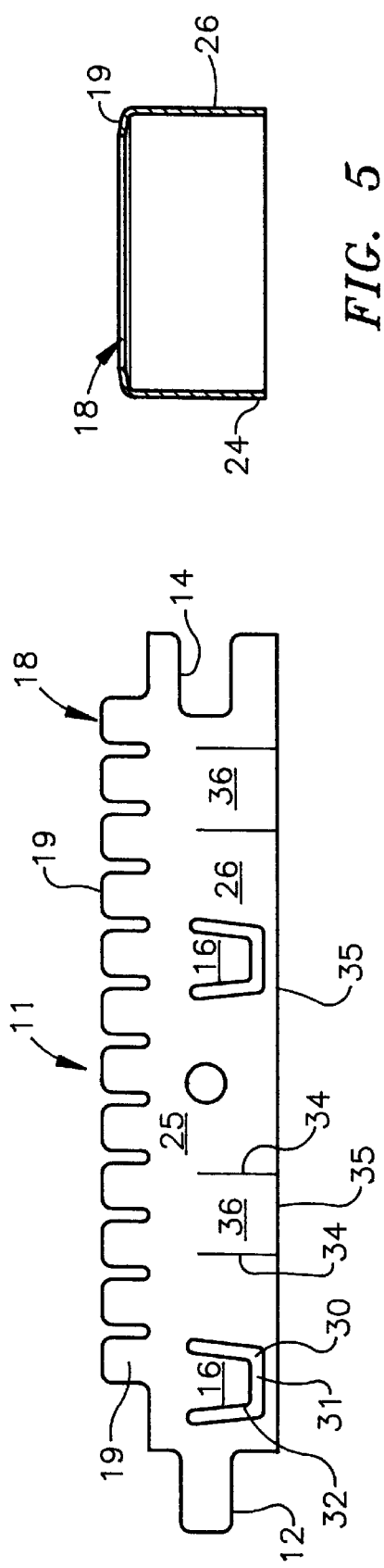
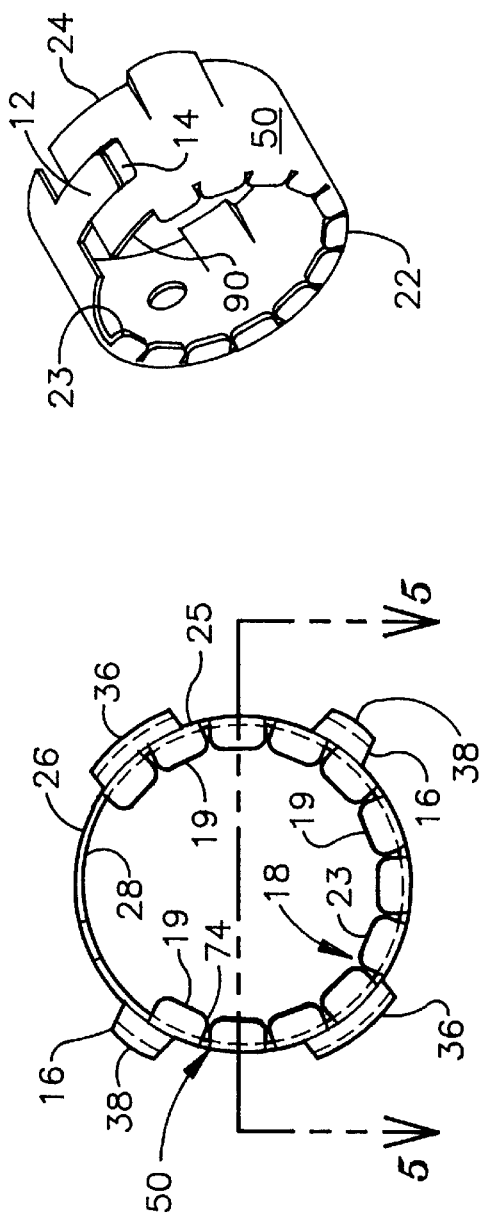

THREADED SNAP IN CONNECTOR

FIELD OF THE INVENTION

The present invention relates to devices for connecting cables and electrical tubing to electrical panels or junction boxes and specifically to a device that is easier to use in a more universal manner than current connectors that are commonly used in the trade.

BACKGROUND OF THE INVENTION

It is common in the electrical industry to connect cable and electrical tubing to electrical junction boxes by means of a variety of standard threaded connectors. The exterior threaded portion of the connectors are pushed into a standard access hole in a junction box or electrical panel and held in the hole by a standard lock nut. This standard lock nut has an interior-thread, which is screwed onto the exterior-threaded electrical connector that extends into the junction box. The lock nut typically has one or more individual threads on its interior circumference to create a locking grip against the wall of the junction box. Sometimes the access hole has internal threads into which the connector is threaded. In that case, no lock nut is needed. Lock nuts used in the electrical trade are commonly formed of metal that is 0.130 inches or more in thickness.

Also, snap fitting connectors are becoming more popular in situations that do not require a threaded lock nut.

While snap fitting connectors have become important, they are still limited to those installations where a locking nut is not desired or a threaded receiver access hole are not present.

Therefore, an acceptable and versatile snap fitting connector or snap ring that can also be removed for use with threaded lock nuts or threaded receptacles is very much needed. Efforts have been made in the past to achieve these goals, but the prior efforts are not believed to have been successful.

SUMMARY OF THE INVENTION

This invention provides a snap ring and threaded electrical connector that is much easier to use in a universal and versatile manner than the current connectors used in the trade. The snap ring is stamped from a single thin piece of spring steel or its equivalent. In the stamping procedure, a locking tab is formed to define a portion that is bent inward to form a lock for mating with a depression located in the leading end of a special connector and includes portions that form snap locking tangs. The stamped piece of spring steel is formed into a circular or annular shape thereby creating a ring shaped snap ring with snap locking tangs slanted to the rear and outward to snap in an access hole in an electrical junction box to prevent pull out. The snap ring also has an inward locking tab around its outer periphery to lock the locking tab to a depression in a portion of the electrical fitting. The locking tabs within the snap ring are sized, positioned and shaped to fit into the mating depression in a manner it cannot be pulled forward relative to the connector. As used herein, the depression is defined to include an opening or a locking recess or depression. The depression may have a partially open bottom but preferably has a bottom wall and is preferably located at an end of the screw threads but may be within the screw threads. The thickness of the snap ring and its shape is critical as it must fit into the space between the outside diameter of the threaded portion of the connector with standard or nominal threads and the inside diameter of the standard access holes in the electrical junction box or panel. Grounding tangs are also lanced rearwardly and outwardly to provide a grounding contact.

To apply the snap ring with the threaded connector, the snap ring is placed over the threaded leading end with the locking tabs located in the locking depressions. The assembled connector and snap ring is then ready for use. When used, the installer simply has to insert the assembled connector into the access hole in the junction box until the flange prevents further insertion. During insertion, the snap locking tangs are forced inwardly by the sidewalls of the junction box hole until the tangs are completely through the hole at which time they snap back and prevent withdrawal. This is a job that can be done by a single hand and makes installation efficient and easy, even in difficult positions. The invention permits the use of the special connector of the invention with standard cable and electrical tubing with standard electrical junction boxes having standard holes. As used herein, electrical junction boxes includes regular electrical junction boxes as well as devices and appliances that have threaded or non-threaded access holes.

In the event it is desired to remove the snap ring, such can readily be done by a screwdriver or other tool or manually so as to unlock and remove the ring from the remainder of the fitting. This exposes the screw thread for use with a standard lock nut when there is no thread opening in an electrical box and also permits the connector to be threaded into a threaded receptacle.

Other advantages of the present invention including other embodiments will be better understood from the following descriptions when read in conjunction with the appropriate drawings.

DESCRIPTION OF THE DRAWINGS

FIG. 1 is a view of the annular snap ring in place on a connector.

FIG. 2 is an exploded view of the connector of FIG. 1 with the annular snap ring and junction box wall omitted.

FIG. 3 is a plan view of the blank used to form the snap ring of the present invention.

FIG. 4 is an end view of the annular snap ring formed from the blank shown in FIG. 3.

FIG. 5 is a sectional view of FIG. 4 taken on section 5—5.

FIG. 6 is a perspective view of FIG. 5 with the trailing end on the right.

DESCRIPTION OF THE INVENTION

Figure 7:
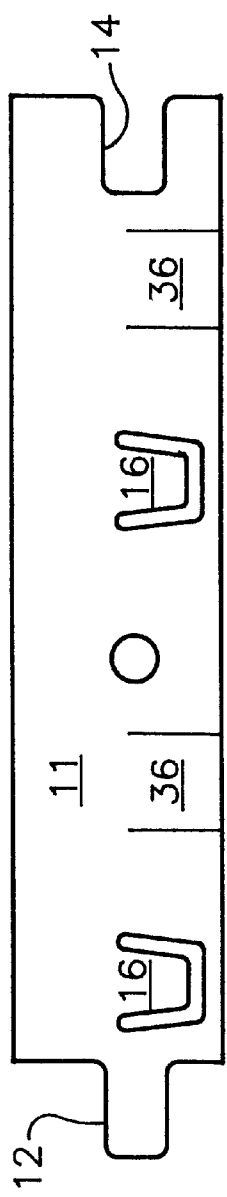
FIG. 7 is a view similar to FIG. 3 of an alternate embodiment.

The present invention comprises an annular snap ring and threaded electrical connector for use with standard electrical junction boxes, including electrical panels, devices, appliances and the like.

With reference to FIG. 3, there is shown a plan view of the blank 11 used to form the snap ring.

The blank is typically stamped from a thin piece of spring steel, such as 1050 spring steel or equivalent, preferably approximately 0.020 inches in thickness plus a zinc plating of 0.00015 inches thick but may be 0.013 to 0.022 inches in thickness. The blank 11 has a tongue 12 on one end and a groove 14 on the opposite end. U-shaped openings 30 in the blank 11 define tangs, which are lanced from the body of the blank. The U-shaped openings have relatively wide slots 32 on each side of the tangs and a slot or shear line 31 at the bottom of the U-shape. The snap locking tangs 16 are bent outwardly and rearwardly. Two slits or narrow openings 34 in blank 11 define grounding tangs 36 that are bent outward and rearwardly adjacent the trailing edge 35. The flat front surface of blank 11 shown in FIG. 3 will become the outer circumference 26 when it is formed into the annular shape of the snap ring.

As shown in FIG. 3, a locking tab 18 having individual locking tab segments 19 is shown.

As shown in FIGS. 1 and 2, edge 22 is the forward or leading end or edge of the snap ring facing into the interior of a junction box and edge 24 is the rearward or trailing edge facing away from the interior of the junction box.

FIG. 4 depicts an end view of blank 11 after it has been formed in a circle or annular shape. Snap locking tangs 16 are angled outwardly and rearwardly from face 25. Grounding tang 36 is angled outwardly and rearwardly. The locking tab segments 19 are bent inward at approximately right angles to the outer circumference. FIG. 5 shows the locking tab 18 which is a cross section 5—5 of FIG. 4 with the snap locking tangs and grounding tangs omitted. As shown in FIGS. 4 and 6, the locking tab 18 may be segmented into individual locking tab segments 19 with the space 74 between segments partly closed when bent into a locking tab 18. A single formed inward locking tab 21 alternative is shown in FIGS. 7 to 10 where like numbers are used.

When blank 11 is formed into an annular shape, tongue 12 loosely fits into groove 14. The blank formed into an annular snap ring 50 is depicted in FIGS. 4 and 6. Usually, the spring steel is heat treated after the forming operation so that the steel will have the correct properties and so that it will hold the annular shape. The blank 11 for a ½ inch trade size is approximately 0.540 inches wide and 2.750 inches long prior to being formed in the annular shape.

Snap locking tangs 16 with outer or abutment edges 38 extend and are angled outwardly and rearwardly from the outer circumference 26 of the snap ring 50 and are located preferably at approximately 180 degrees from each other.

The snap locking tangs form an outermost diameter of approximately 1.00 inches for a ½ trade size connector. Except when specifically indicated otherwise herein, all dimensions are with reference to a ½ inch trade size fitting.

The locking tab 18 extends inwardly from the inner circumference 28 at the approximate angle shown which is approximately a right angle to form an inner diameter of approximately 0.605 as measured at the inner edge 23 of the locking tab 18.

The inner edge 23 of locking tab 18 drops into depression 20 so that the inner edge 23 contacts the base 80 of the depression. The depression 20 has a forward wall 82 and a rearward wall 84 with the depression being approximately 0.068 inches wide and is approximately 0.060 inches deep. The depression 20 is near the leading edge of the connector and preferably spaced approximately 0.090 inches from the end. This prevents the snap ring from linear forward movement with respect to the connector thus, the snap ring is locked onto the connector unless a tool or fingers are used to raise the locking tab 18 out of the depression 20.

As seen in FIGS. 4 and 6, the individual segments 19 are 12 in number and extend circumferentially approximately 270° with a space 90 extending over the area covered by the tongue 12 and groove 14.

Figure 11:
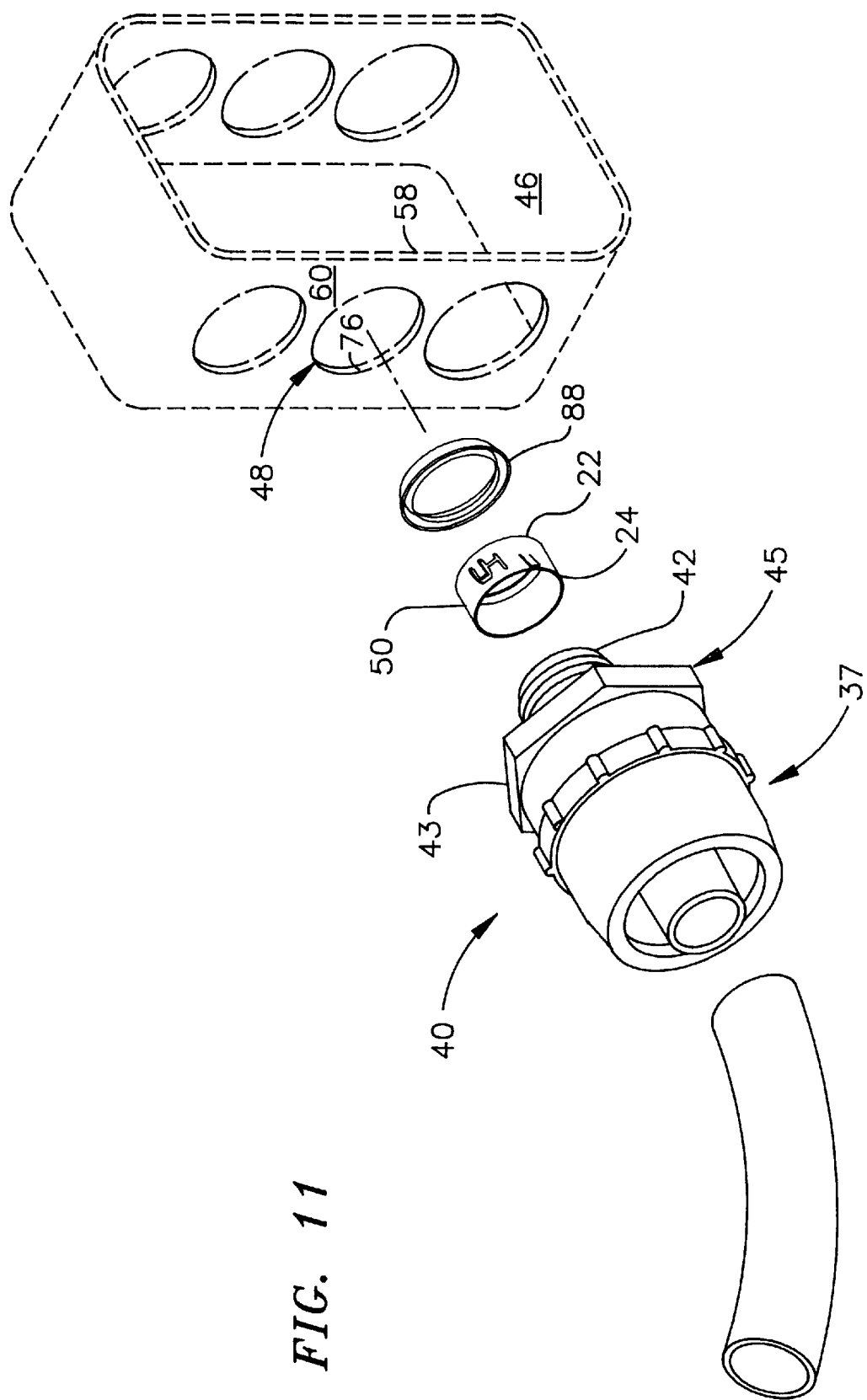
FIG. 11 shows an exploded view of a typical connector using this invention.

FIG. 11 depicts the annular snap ring 50 and connector 40 fastened to an electrical junction box wall 46. To apply the snap ring 50, it is first fastened on the external threaded end 42 of the connector 40.

The connector 40 has a trailing end 37. The trailing end represents the entire range of various electrical connectors that may be used for clamping a cable or conduit. For illustrative purposes, there is shown in FIGS. 1 and 2, a body 44 with external threads for receiving a conduit as one form of electrical connector. The trailing end 37 shown in FIG. 11 shows a liquid tight connector. Also, a seal washer 88 is shown in both FIG. 11 and FIG. 2.

As the connector 40 and snap ring 50 are pushed into the access hole or knock-out 48, the locking tangs 16 are forced inward toward the central axis of the annular snap ring. The spring steel material of construction of the snap ring 50 allows the locking tangs to flex inwardly toward the central axis. When the snap ring 50 is advanced sufficiently into the access hole 48, the locking tangs spring outward as their abutment edges 38 pass completely through the electrical junction box wall 46. As a result, the connector 40 is locked tightly into place on each side of the wall 46 between the forward wall 43 of flange 45 of the connector 40 on one side abutted with the outer surface 60 of the junction box wall 46 and the locking tangs 16 abutted with their abutment edges 38 against the inner surface 58 of the junction box wall 46.

When installed in a junction box, as depicted in FIG. 11, the leading edge 22 of the snap ring is inside the junction box and the outer or trailing edge 24 is within the confines or side walls 76 of the access hole 48. The grounding tangs 36 extend outward approximately 0.020 inches and are forced inward by the inside wall of access hole 48 so that the trailing grounding edge 24 of the grounding tang makes firm contact within the side walls of the access hole 48 of the electrical junction box. Thus, the side walls 76 serve to encircle the trailing end or edge 24 to assist in keeping the annular snap ring 50 from expanding outward. The connector is highly resistive to pull out forces when the connector 40 and snap ring 50 are locked in place.

The outer diameter of the annular snap lock ring in its relaxed or unstretched shape is preferably circular and, as measured from its outer surface 52, is approximately 0.850 inches in diameter for ½ inch nominal trade size threads. The dimensions of the snap locking ring mentioned herein are for use with a threaded connector having ½ inch NPS (National Pipe Straight) or NPT (National Pipe Taper) trade size thread.

With reference to FIGS. 1 and 2, there is shown the connector of this invention with nominal size threads 66, which have been slightly truncated at 67. The threads are of standard pitch and depth but the slight truncation at 67, which is flat or slightly rounded, reduces the normal maximum diameter of the threaded portion. This truncation is typically approximately ⅟₃₂ in width. As used herein a truncated thread is meant to be a nominal trade size thread which has the crest of the thread slightly flattened or rounded to reduce the major diameter. Otherwise, the thread is unchanged and when the snap ring is removed, can be readily threaded into the threaded opening of a junction box or can be used with a standard lock nut (not shown). As used herein, a reduced diameter thread is a trade size thread or similar size thread which will be accepted into a standard trade size threaded access opening of an electrical junction box. The best way of providing the reduced diameter is by truncation as mentioned herein but other techniques may also be envisioned such as modified threads. However, sufficient clearance between the outer surface of the threaded part and the inside diameter of a standard non-threaded access opening of an electrical junction box must be sufficient to accommodate the wall thickness of the annular snap ring 50.

As is best seen in FIG. 2, the threaded portion is foreshortened and only runs from the depression 20 to the depression 86. The depression 86 is adjacent the raised section 70.

The nominal knockout or access hole for an electrical junction box is 0.875 inches in diameter. Usually the manufacture provides an opening 0.870 to 0.880 inches in diameter. However, the access hole can be as small as 0.859 inches in diameter (including tolerances).

The snap ring could be constructed for other standard trade size threads by scaling these dimensions including truncating appropriate to the nominal trade sizes such as for nominal trade sizes ¾ inch or 1 inch.

The nominal major diameter of the threads 66 is normally approximately 0.803 to 0.806 inches but is approximately 0.795 inches after this has been reduced by the truncated crest 67. This leaves sufficient space between the major truncated diameter and the minimum diameter of 0.859 inches for the access hole to accommodate the thickness of the wall of the snap ring.

Figure 10:
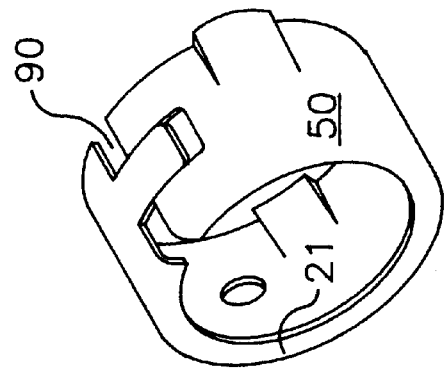
FIG. 10 is a perspective view of FIGS. 8 and 9.
Figure 9:
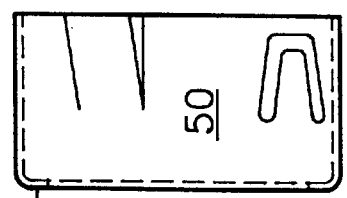
FIG. 9 is a side view of the annular snap ring of FIG. 8.

The tongue 12 and groove 14, as best seen in FIGS. 6 and 10, are designed so that there is a minimum fit between the tongue and groove from side to side and the groove and tongue are generally rectangular in shape and not tapered. This helps to prevent the snap locking or snap ring 50 from being entangled when a number of them are in loose fashion prior to assembly.

With reference to FIG. 1, it is seen that the truncated threads 67 are of an overall length of typically 0.300 inches and have a front or leading non-threaded section 98 of 0.075 inches that includes depression 102. There is also a trailing section 68 with a recess 86 of 0.05 inches and a raised section 70 to accommodate gasket material 88.

It will be readily apparent to one skilled in the art that the embodiment of FIGS. 7 to 10 is similar to the embodiment of the preferred FIGS. 1 to 6 and 11 and serves the same function and purposes except for the obvious differences of using a single formed locking tabs.

Figure 8:
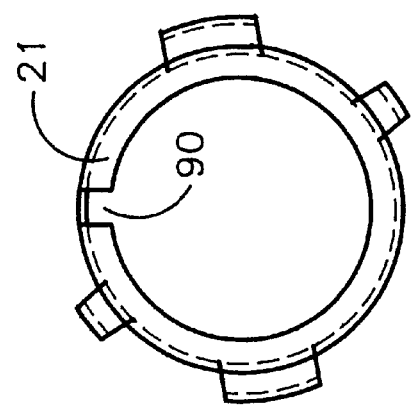
FIG. 8 is a view of the leading end of the annular snap ring of FIG. 7.

There is shown a blank 11 of a snap ring with a tongue 12, groove 14, snap locking tangs 16 and grounding tangs 36. The blank 11 is formed into an annular snap ring 50 by a metal forming operation that forms the single formed inward locking tab 21. As is seen in FIG. 8, the locking tab extends circumferentially except for that portion defined by space 90 to accommodate the tongue 12 and groove 14.

FIG. 11 shows an exploded view of a typical installation of the invention. The electrical box has an access hole with an inside circular wall. This wall assists in encircling the trailing edge of annular snap ring 50 by encircling the trailing end and restraining its outward expansion. This is also assisted by the trailing end of the grounding tangs pressing against the wall of the access hole.

As used herein the terms relating to right angles and inclined inward are in reference to an axis through the longitudinal center of the connector 40.

Thus, the invention defines a versatile threaded snap in connector that is readily utilized by electricians to connect cable and electrical tubing to electrical junction boxes with the easily applied snap in feature for connection to an electrical junction box; but, at the same time can be utilized to make the connection by lock nut or by threaded access holes. To expose the threads for the threaded connection, it is only necessary to remove the snap ring. Because of this arrangement, the electrician can minimize his variety of connectors for a job.

Various references herein such as bent inward and so forth are with reference to the longitudinal axis of the snap ring or the connector as the case may be.

This application relates to and includes by reference the entire disclosure of pending U.S. application Ser. No. 09/565,724 filed May 5, 2000.

Having thus described the invention, it is to be understood that the invention is not to be limited by the description herein but is defined as follows by the appended claims.

What is claimed is:

1. A threaded snap in connector for attachment to an electrical junction box:

A connector having a trailing end portion;

A leading end portion on said connector having a leading edge;

A flange separating said trailing end portion from said leading end portion;

Truncated nominal size threads on said leading end portion;

A depression on said leading end portion which is generally circular with two opposite side walls and a bottom with one of said side walls closer to said leading edge at approximately a right angle to said connector;

A removable annular shaped snap ring having an approximate thickness of 0.013 inches to 0.022 inches with a first end in the form of a tongue and a second end in the form of a groove which has a leading edge and a trailing edge surrounding said leading end portion;

A grounding tang extending outward and rearwardly at said trailing edge of said annular snap ring;

Inward turned locking tab on said leading edge portion of said snap ring extending at an approximately right angle into said depression;

Said annular shaped snap ring being of a length that enables said trailing edge to be encircled by the inside side walls of an access hole in an electrical junction box; and A snap locking tang on said snap ring extending outwardly to resist the connector from being pulled from an electric junction box.

2. A threaded snap in connector for attachment to an electrical junction box:

A connector having a trailing end portion;

A leading end portion on said connector having a leading edge,

A flange separating said trailing end portion from said leading end portion;

Threads on said leading end portion having a diameter;

A generally circular depression on said leading end portion;

A removable annular shaped snap ring with a leading edge and a trailing edge surrounding said leading end portion and having a thickness that fits into a space between said diameter of said threads and a diameter of an access hole of an electrical junction box;

Inward turned locking tab on said leading edge portion of said snap ring extending into said depression; and A snap locking tang on said snap ring extending outwardly to resist the connector from being pulled from said access hole of said electrical junction box.

3. The connector of claim 2 where said annular shaped snap ring has a grounding tang extending outward and rearwardly at said trailing edge of said annular shaped snap ring.

4. The connector of claim 2 where said inward turned locking tab has a multiplicity of individual locking tab segments.

5. The connector of claim 2, where said inward turned locking tab is a single arcuate segment.

6. The connector of claim 2, wherein said depression is generally circular with two opposite side walls and a bottom with one of said side walls closer to said leading edge and is approximately at a right angle to said connector.

7. The connector of claim 2, wherein said annular shaped snap ring is of a length that enables said trailing edge to be encircled by the inside side walls of an access hole in an electrical junction box.

8. The connector of claim 2 wherein said threads are of reduced diameter.

9. The connector of claim 2 wherein said threads are truncated nominal trade size threads.

10. The connector of claim 2 wherein said depression is adjacent said leading edge of said leading end portion.

11. An electrical junction box connector comprising:

An electrical junction box having an access hole with an inside wall of a standard trade size;

A threaded snap in connector attached to said electrical junction box through said access hole;

A trailing end portion on said connector;

A leading end portion on said connector having a leading edge;

A flange separating said trailing end portion from said leading end portion;

A depression on said leading end portion adjacent said leading edge of said leading end portion;

Threads on said leading end portion;

A removable annular shaped snap ring with a leading edge and a trailing edge surrounding said leading end portion;

Inward turned portion on said leading edge of said snap ring forming a locking tab to prevent said snap ring from being removed in a linear forward direction from said leading end portion; and A snap locking tang on said snap ring and extending outwardly to resist the connector from being pulled from said electric junction box.

12. The junction box connection of claim 11 wherein said removable annular shaped snap ring has a first end in the form of a tongue and a second end in the form of a groove with said two ends meeting each other to complete the annulus.

13. The junction box connection of claim 12 wherein said tongue and said groove are substantially rectangular with closely facing side walls that slide past one another.

14. The junction box connection of claim 11 where said annular shaped snap ring has a thickness of from approximately 0.013 to approximately 0.022 inches.

15. The junction box connection of claim 11 wherein said annular shaped snap ring has a grounding tang extending outward and rearwardly of said trailing edge of said annular shaped snap ring with said grounding tang in electrical contact with said inside wall of said access hole.

16. The junction box connection of claim 11 wherein said locking tab is angled inwardly at approximately right angles to said threaded snap in connector.

17. A method of making an electrical junction box connection including the following:

Providing an electrical junction box having a wall and an access hole with an inside wall in the access hole of a standard trade size;

Providing a threaded snap in connector having a leading end portion and a trailing end portion, a flange separating the trailing end portion and said leading end portion and threads and a depression on the leading end portion;

Providing a removable annular shaped snap ring surrounding the leading end portion with inwardly turned locking tab on said snap ring angled inwardly and entering the depression to prevent the snap ring from moving forwardly with respect to the connector;

Providing a snap locking tang on the snap ring angled rearwardly and outwardly;

Determining whether to use the connector's threading or a snap ring for holding the connector to the junction box;

If the decision is to use a snap ring:

Pushing the connector toward the access hole with the snap locking tang being forced inward until the junction box wall is cleared and snap locking the connector to the junction box;

If the decision is to use the connector's threading:
(1) Removing the annular ring by lifting the locking tab out of the depression;
(2) Providing either an access hole with a threaded opening or a threaded lock nut; and
(3) Screwing the connector into the threaded access hole or pushing the connector into the access hole and holding in place by a lock nut.

* * * * *